United States Patent
Urban (10) Patent No.: US 6,674,524 B2
(45) Date of Patent: Jan. 6, 2004

(54) ARRANGEMENT FOR THE VISUAL INSPECTION OF SUBSTRATES

(75) Inventor: Karsten Urban, Jena (DE)

(73) Assignee: Leica Microsystems Jena GmbH, Jena (DE)

(*) Notice: Subject to any disclaimer, the term of this patent is extended or adjusted under 35 U.S.C. 154(b) by 51 days.

(21) Appl. No.: 10/041,560

(22) Filed: Jan. 10, 2002

(65) Prior Publication Data

US 2002/0097394 A1 Jul. 25, 2002

(30) Foreign Application Priority Data

Jan. 19, 2001 (DE) .......................... 101 02 542

(51) Int. Cl.$^7$ ............................................. G01N 21/00
(52) U.S. Cl. ................................................ 356/237.2
(58) Field of Search ............................. 356/237.1, 237.2, 356/237.3, 237.4; 382/144–150

(56) References Cited

U.S. PATENT DOCUMENTS

| | | | | |
|---|---|---|---|---|
| 4,555,798 A | * | 11/1985 | Broadbent et al. ........... | 382/144 |
| 4,746,256 A | * | 5/1988 | Boyle et al. ............. | 414/217.1 |
| 4,938,654 A | * | 7/1990 | Schram ..................... | 414/757 |
| 6,088,474 A | * | 7/2000 | Dudasko et al. ............ | 382/145 |
| 6,241,456 B1 | * | 6/2001 | Kato et al. .................. | 414/783 |
| 6,405,610 B1 | * | 6/2002 | Komatsu et al. ........... | 73/865.9 |
| 6,535,626 B1 | * | 3/2003 | Pressman et al. ........... | 382/133 |

* cited by examiner

Primary Examiner—Michael P. Stafira
(74) Attorney, Agent, or Firm—Foley & Lardner (57) ABSTRACT

An arrangement for the visual inspection of substrates (S) comprises a microscope (2) for viewing the substrate (S) present at an inspection point (I); at least one viewing field (11), arranged next to a microscope viewing port (2a), for viewing an image or an image area of the substrate (S); and/or at least one further viewing field (12), arranged next to the microscope viewing port (2a), for direct viewing of the substrate (S) or a portion of the substrate (S); the microscope viewing port (2a) and the viewing fields (11, 12) being arranged with respect to an operating position (P) in such a way that from the operating position (P), the viewer looks in a first viewing direction (A) perpendicularly onto the microscope viewing port (2a), and in at least one further viewing direction (B, B') approximately perpendicularly in each case onto one of the viewing fields (11, 12). The first viewing direction (A) and the viewing directions (B, B') enclose acute angles (α, α'). The result is to create an inspection arrangement notable for favorable ergonomic properties and a compact design.

20 Claims, 8 Drawing Sheets

ARRANGEMENT FOR THE VISUAL INSPECTION OF SUBSTRATES

CROSS REFERENCE TO RELATED APPLICATIONS

This invention claims priority of the German patent application 101 02 542.4 which is incorporated by reference herein.

FIELD OF THE INVENTION

The invention refers to an arrangement for the visual inspection of substrates, equipped with a microscope for viewing a portion of the substrate located at an inspection point.

BACKGROUND OF THE INVENTION

Figure 7:
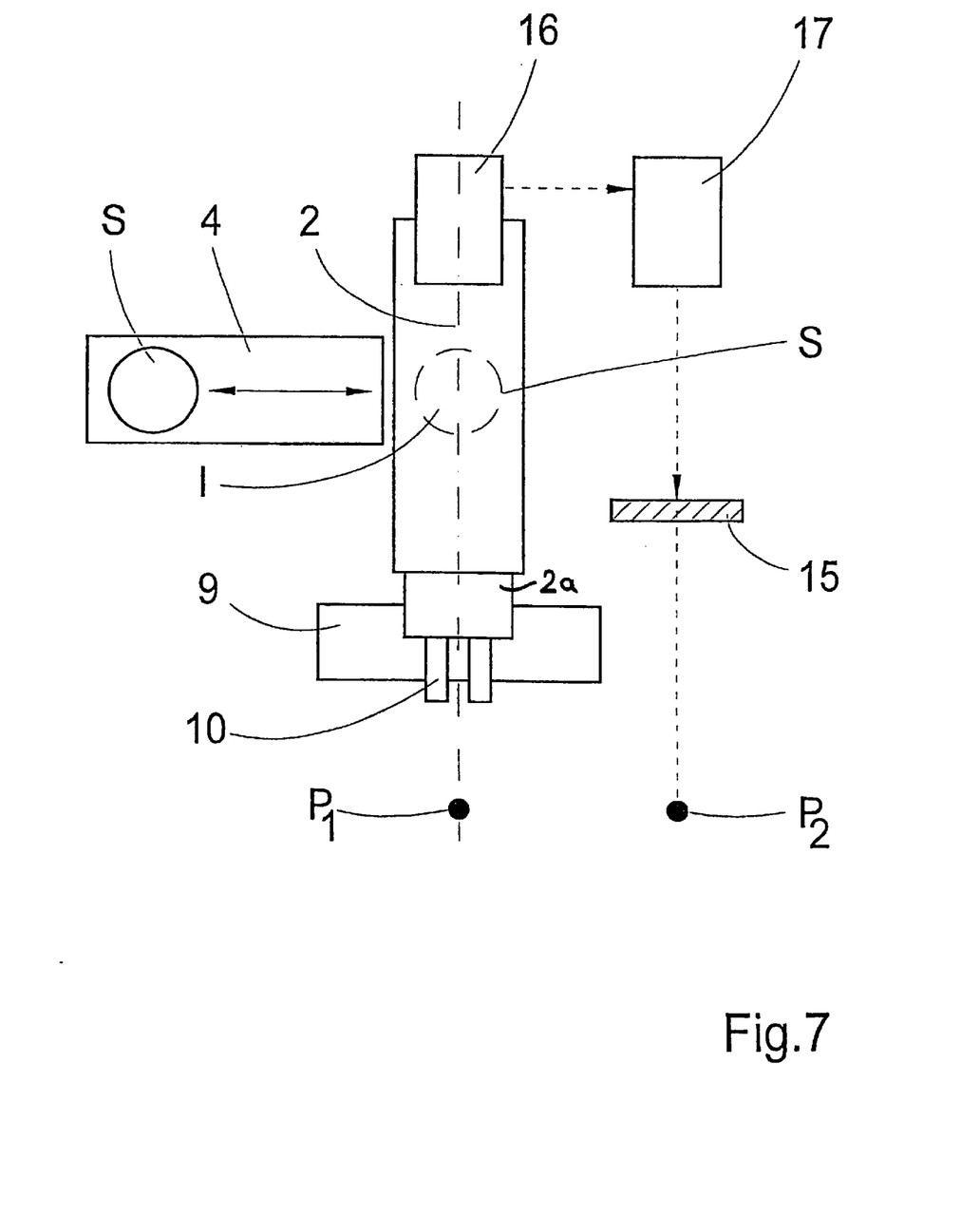
FIG. 7 is a plan view of a previously known inspection arrangement.
Figure 8:
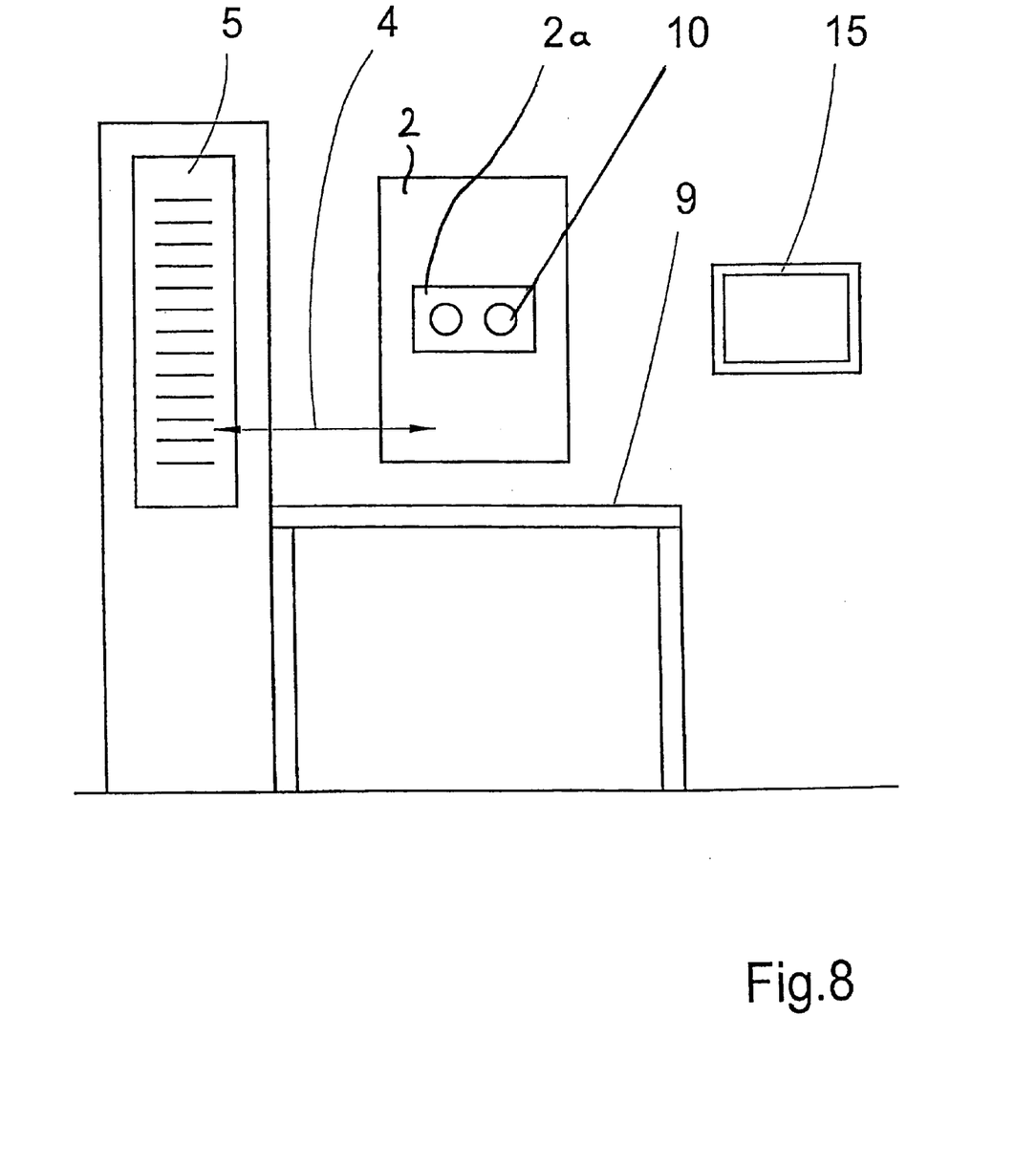
FIG. 8 is a side view of the known inspection arrangement of FIG. 7.

Arrangements of this kind are used in particular in semiconductor production for the inspection of wafers, in order to examine them for manufacturing defects. An arrangement of this kind is, for example, marketed by the LEICA company under the designation INS 3000. This arrangement, which is depicted schematically in FIG. 7 and FIG. 8, comprises a transport device 4 with which wafers having diameters from 100 to 200 mm are delivered to inspection point I. At inspection point I, portions of the wafer to be inspected can be viewed with the aid of a microscope.

A monitor 15 is additionally set up next to the microscope. On this monitor 15, the viewer is offered a function menu that displays various setting options for the inspection arrangement, for example the type of illumination for a wafer to be inspected, or an opportunity to select an examination region on the wafer. In addition, an image of the wafer presently being examined, or of a portion of that wafer, can be displayed on monitor 15 so that defects on the wafer can also be detected on the basis of the monitor image.

During inspection, an operator sits or stands in front of the microscope and views through its eyepiece 10 the wafer or the portion of interest of that wafer. In this viewing position, which is labeled $P_1$ in FIG. 7 and FIG. 8, the operator can control the operation of the inspection arrangement—for example the advance movement upon transport of a wafer into the inspection position, selection of a region to be examined on the wafer, and the like—by way of the control console present in front of him or her, without changing his or her position. Because of its orientation parallel to eyepieces 10 of the microscope, however, the monitor set up next to the microscope is poorly visible, since its most favorable viewing position $P_2$ is located right alongside operating position $P_1$.

In addition, in inspection arrangements of this kind such as those also known, for example, under the designation "Optistation 7" of the Nikon company, the monitor is arranged too close to the operator. Because of the working distance that must be maintained, in such cases it is possible to use only a relatively small monitor on which details are sometimes difficult to recognize.

SUMMARY OF THE INVENTION

Proceeding from this existing art, it is the object of the invention to develop further an arrangement of the kind cited initially with ergonomics in mind and with the criterion of a compact design.

For that purpose, according to the present invention at least one viewing field for viewing an image or an image area of the substrate, and/or at least one further viewing field for direct viewing of the substrate or a portion of the substrate, is provided next to the microscope viewing port. The microscope viewing port and the viewing fields are arranged with respect to an operating position in such a way that from the operating position, the viewer looks in a first viewing direction perpendicularly onto the microscope viewing port, and in at least one further viewing direction approximately perpendicularly in each case onto one of the viewing fields. In addition, the first viewing direction encloses an acute angle in each case with the further viewing direction or directions.

This allows the operator to work in relaxed and fatigue-free fashion, since it is now possible, from the operating position, to look with a slight inclination or rotation of the head substantially perpendicularly onto the viewing fields present next to the microscope viewing port. The result of this is better identifiability in the region of the viewing fields, as a result of which the error rate during inspection of the wafers can be reduced.

Because of the oblique position of the viewing field with respect to the operating position, the distance between the operating position and the viewing field is moreover increased, so that the latter can be made larger than previously. It is thus possible, for example, to display more operating options or to show a larger image of the portion of the substrate presently being examined.

In a particularly advantageous embodiment of the invention, the arrangement furthermore comprises a housing that surrounds the inspection point of the microscope. The microscope itself is for the most part received in the housing. The viewing field or fields furthermore is or are integrated into one of the outer walls of the housing. This encapsulation not only is attractive in terms of external appearance, but also, principally, allows inspection of the substrates under enhanced cleanliness conditions. For example, an enhanced level of cleanliness can be confined to the interior of the housing. In addition, the encapsulation prevents the risk of operator error or improper actions when positioning the substrates on the inspection point of the microscope. The encapsulation furthermore contributes to workplace safety for the operator.

In a further advantageous embodiment of the invention, a conveying device is additionally provided for transporting the substrates to and away from the inspection point. The control instructions for the conveying device, which is arranged inside the housing, can be entered via the control console.

Furthermore, at least one magazine for receiving the substrates can be integrated into the arrangement, a transfer device for transferring substrates between the magazine and the conveying device additionally being provided. The result is to create a completely closed module for substrate inspection that can be set up, for example, in the vicinity of a wafer production line. Interchangeable magazines are preferably used in this context, thus making possible faster exchange of the substrates to be examined. The magazine or magazines can be configured as separate modules that can be connected to the housing of the inspection arrangement.

For an ergonomically favorable arrangement of the viewing field or fields, it is moreover advantageous if the first viewing direction encloses an angle of less than 50° with the further viewing directions, the operating position being located approximately at the vertex. In practice, angles in the range from 30° to 40° have proven particularly ergonomically favorable.

In a particularly advantageous embodiment, one viewing field is arranged in the horizontal direction on each of the two sides of the microscope viewing port. This thus makes possible, as it were, a panoramic view from the operating position, in which the angle of view is based on operator's natural field of view.

Preferably the two viewing fields are positioned in ergonomically favorable fashion at the same viewing height. In addition, the respective viewing directions toward the viewing fields can enclose identical angles with the first viewing direction, i.e. toward the microscope viewing port. This results in a symmetrical arrangement with respect to the microscope arranged in the middle.

It is not necessary, however, to provide two viewing fields.

A monitor on which an image or image area of the substrate can be visualized is preferably arranged in one viewing field. It is thereby possible to analyze the substrate or a portion thereof with particularly high accuracy. In a particularly simple variant embodiment, this monitor alone serves to provide information about the substrate to be inspected.

It is possible in principle to display on the monitor images of the substrate that are obtained outside the inspection point of the microscope. In a particularly advantageous embodiment of the invention, however, images of the substrate or of parts thereof are generated with the aid of the microscope on the monitor. For that purpose, the microscope is coupled to an optoelectronic camera and the latter is connected via an electronic image processing device to the monitor.

In a further embodiment of the invention, one viewing field is configured as a transparent panel through which a substrate position can be looked at directly. In this fashion, for example, transportation of the substrates into the inspection position can be easily observed and monitored.

A wobbler having a plate for holding a substrate can be arranged in the visible region of the viewing field behind the transparent panel. This plate can rotate about a rotation axis and can tilt with respect to the rotation axis. Upon rotation of the plate, a substrate held thereon performs a wobbling motion so that the substrate can be viewed from the operating position from different angles of view. This makes it possible, in particular, to verify scratches or contaminants such as dust particles on the substrate as defects.

If the inspection region is imaged through the microscope and displayed on a monitor, it is not absolutely necessary to use the microscope viewing port for inspection. The possibility of observation through the microscope is desirable in most cases, however, and the microscope is preferably configured as a stereomicroscope having two eyepieces.

For ergonomic reasons, the eyepieces and the viewing fields are preferably arranged at one height. The operator can thus rapidly change viewing directions with a small head movement, and can look either through the eyepieces or, for a quick visual check, at the viewing field or fields.

In order to prevent excessive leaning over the control console and an unfavorable head posture on the part of the operator during inspection, the eyepieces preferably extend over the control console. It is advantageous in terms of a compact design to arrange the control console as close as possible to the housing. In order still to make possible a sufficient viewing distance to the viewing fields in such a case, the latter are arranged in a recess of the outer wall of the housing. To make possible a rapid change in viewing direction, a distance of preferably approximately 30 cm is provided in each case between the eyepieces and a viewing field.

BRIEF DESCRIPTION OF THE DRAWINGS

The invention will be described in more detail below with reference to exemplary embodiments. In the accompanying drawings.

DETAILED DESCRIPTION OF THE INVENTION

Figure 1:
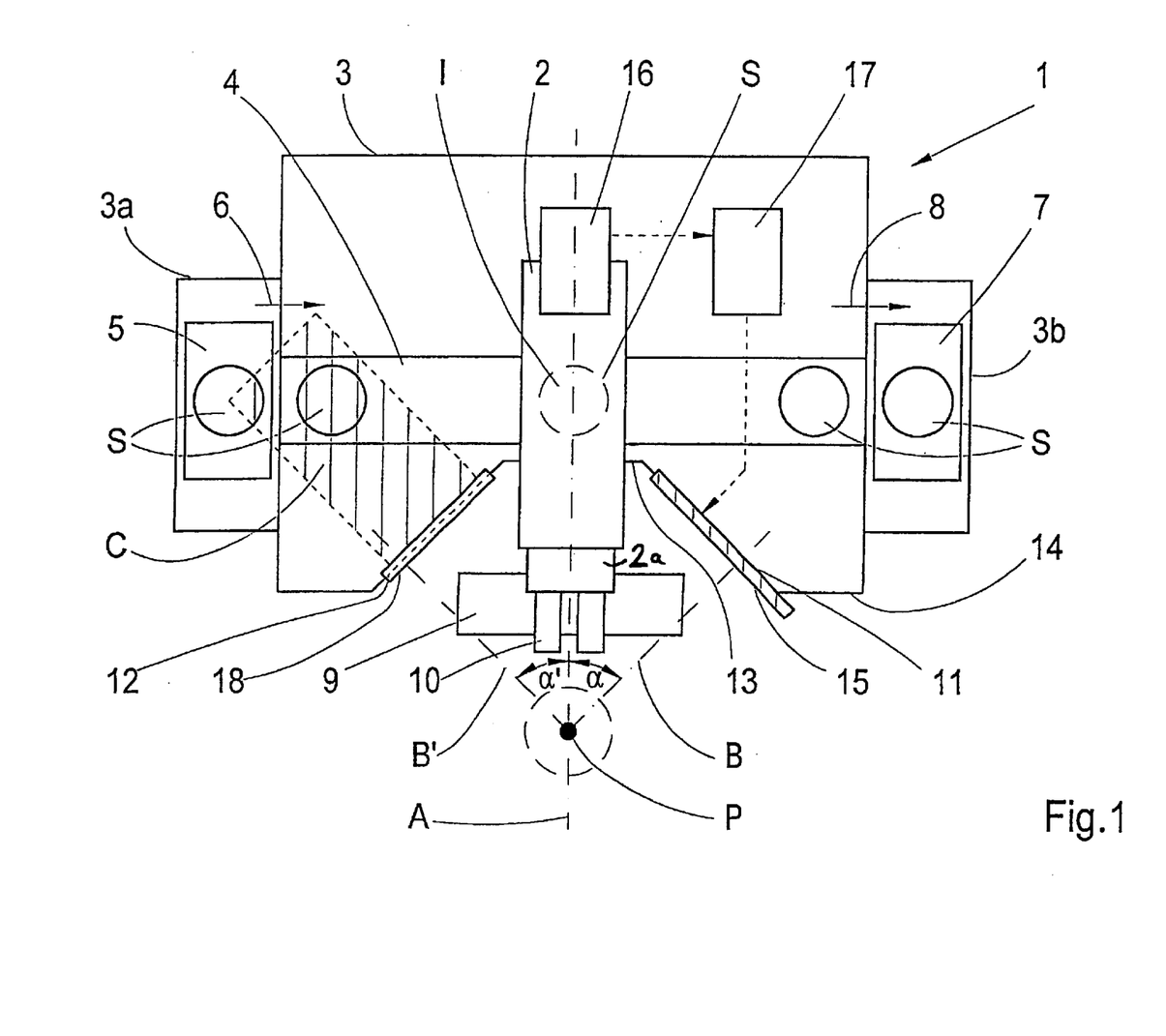
FIG. 1 schematically depicts a first exemplary embodiment of an inspection arrangement according to the present invention, in a plan view.
Figure 2:
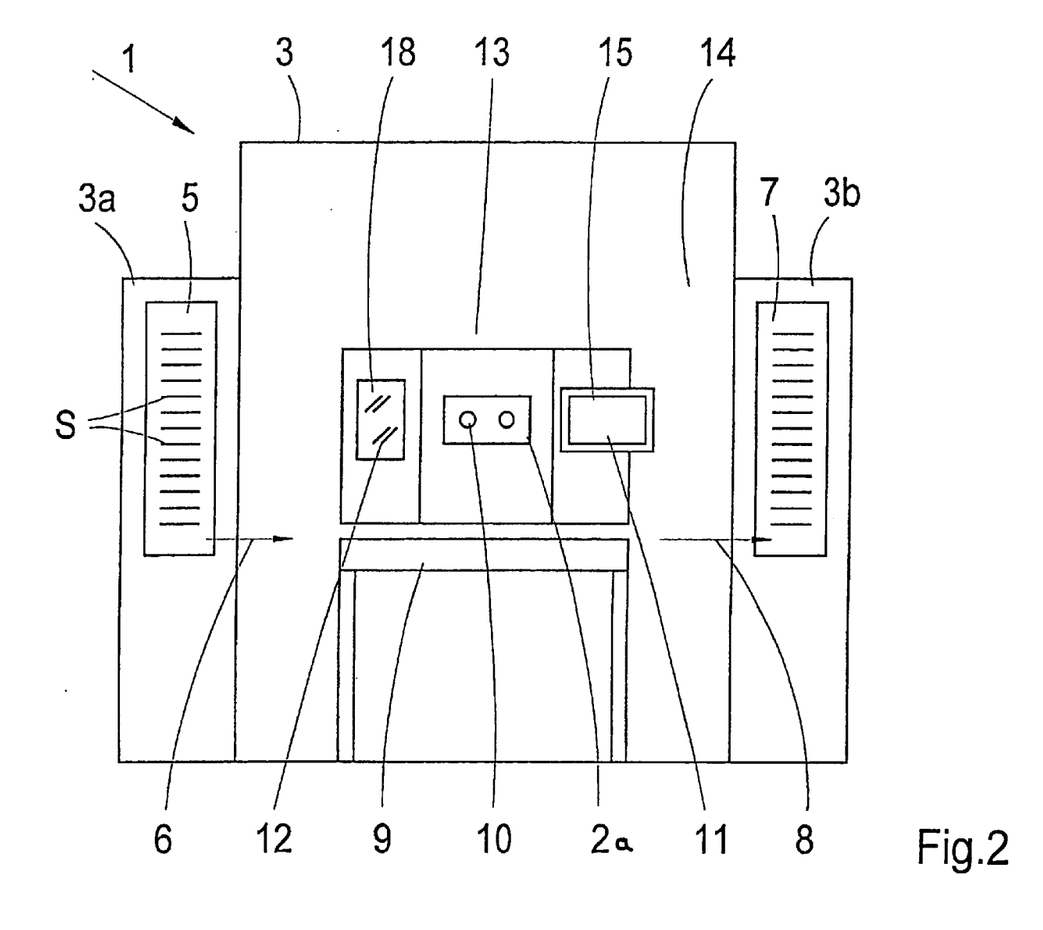
FIG. 2 is a side view of the inspection arrangement of FIG. 1.

The first exemplary embodiment in FIG. 1 and FIG. 2 shows an inspection arrangement 1 with which planar substrates S, for example wafers, can be microscopically examined. In particular, with inspection arrangement 1 it is possible to examine in more detail wafers that, during manufacture, have been judged to be defective and have been discarded, for example in order to ascertain the reason for the defect.

Inspection arrangement 1 comprises an observation instrument, in particular a microscope 2 having a microscope viewing port 2a, that can be directed onto a substrate S (here, a wafer) located on an inspection point I. Inspection point I is surrounded by a housing 3 in which the microscope 2 is simultaneously also received. Also provided in housing 3 is a conveying device 4 for transporting substrates S to and from inspection point I.

Inspection arrangement 1 furthermore comprises a first magazine 5 for receiving multiple substrates S. Also provided is a transfer device 6 which transfers substrates S from first magazine 5 to conveying device 4. After inspection, substrates S are collected in a second magazine 7. A further transfer device 8 serves to transfer substrates S from conveying device 4 into second magazine 7.

Magazines 5 and 7 are preferably configured as replaceable magazines in which substrates S are stacked one above another. For that purpose, each of magazines 5 and 7 is coupled separately onto housing 3. It is also possible to integrate each of the magazines into an additional housing module 3a and 3b, respectively.

Depending on the conditions of the installation location, the additional housing modules 3a and 3b can be coupled to different sides of housing 3, conveying device 4 then being correspondingly adapted.

Given a suitable configuration of the transport path of substrates S to inspection point I, magazines 5 and 7 can also be received in a common housing module. It is moreover possible to use a single magazine from which substrates S are transported to the inspection point, and from there transported back into the magazine.

Inspection arrangement 1 furthermore comprises a control console 9 that is arranged on one side of housing 3 at operating position P. Two eyepieces 10 that extend over control console 9 are provided for that purpose on microscope viewing port 2a that projects out of housing 3. This also makes it possible to work from operating position P in relaxed fashion and with little fatigue. In particular, the operator does not need to lean far over control console 9 when looking through eyepieces 10, but rather can maintain a substantially upright head position.

Also provided on housing 3 in addition to microscope viewing port 2a are a viewing field 11 for displaying an image or an image area of substrate S, and a viewing field 12 for direct viewing of substrate S or a portion of substrate S. The two viewing fields 11 and 12 are inclined with respect to operating position P in such a way that an operator present in front of microscope viewing port 2a is looking substantially perpendicularly at the respective viewing field 11 or 12.

As may be gathered in particular from FIG. 2, the two viewing fields 11 and 12 lie at the same height as microscope viewing port 2a or eyepieces 10, resulting in a kind of panoramic view for an operator in operating position P.

The oblique position of viewing fields 11 and 12 is achieved by means of a recess 13, approximately trapezoidal in profile, in outer wall 14 of housing 3. Viewing fields 11 and 12 are arranged with respect to microscope viewing port 2a in such a way that in a first viewing direction A the viewer looks perpendicularly onto microscope viewing point 2a, and in further viewing directions B and B' the viewer looks perpendicularly onto the respective viewing field 11, 12. First viewing direction A and the respective further viewing directions B and B' respectively enclose acute angles $\alpha$ and $\alpha'$, operating position P constituting the vertex of said angle. In the exemplary embodiment depicted, angles $\alpha$ and $\alpha'$ are each in the range from 30° to 40°. Both viewing fields 11 and 12 are therefore visible to the operator from operating position P.

In the first exemplary embodiment a monitor 15, for example a 15" LCD on which an operating menu can be displayed, is arranged in viewing field 11. Said monitor 15 is additionally used to display an image of substrate S to be inspected or of the portion of substrate S present located at inspection point I. An image acquisition device 16 in the form of a camera, coupled to the microscope 2, is also provided inside housing 3 for that purpose. The image data acquired by means of image acquisition device 16 from a substrate S are transferred to an electronic image processing device 17 and there converted into the display format of monitor 15.

The display on the monitor can be presented alternately with the operating menu. It is also possible, however, to display the image of the portion presently being examined in addition to the operating menu, on one part of the surface of monitor 15.

It is also possible to provide multiple viewing fields 11 with monitors; then, for example, the operating menu is displayed on one monitor and the image of a substrate S is displayed on another monitor.

In the first exemplary embodiment according to FIGS. 1 and 2, however, only one viewing field 11 with one monitor is provided, and second viewing field 12 is configured as a transparent panel 18. In principle, a simple opening in housing 3 can be present instead of transparent panel 18. Transparent panel 18 does, however, make possible complete encapsulation of housing 3.

The conveying of substrates S to inspection point I can be monitored from operating position P through transparent panel 18. It is furthermore possible to arrange in visible region C of viewing field 12, inside housing 3, a so-called wobbler. The latter comprises, inter alia, a plate for holding a substrate S or wafer. Said plate (not depicted) is rotatable about an axis. At the same time the plate is inclined with respect to the rotation axis, so that upon rotation of the plate, a substrate S placed thereon performs a wobbling motion. By means of suitable illumination of substrate S located on the plate, the operator can detect gross surface defects on the substrate, for example scratches or color patterns. Particles adhering to substrate S, for example specks of dust, can moreover be perceived and thus identified as defect sources.

Figure 3:
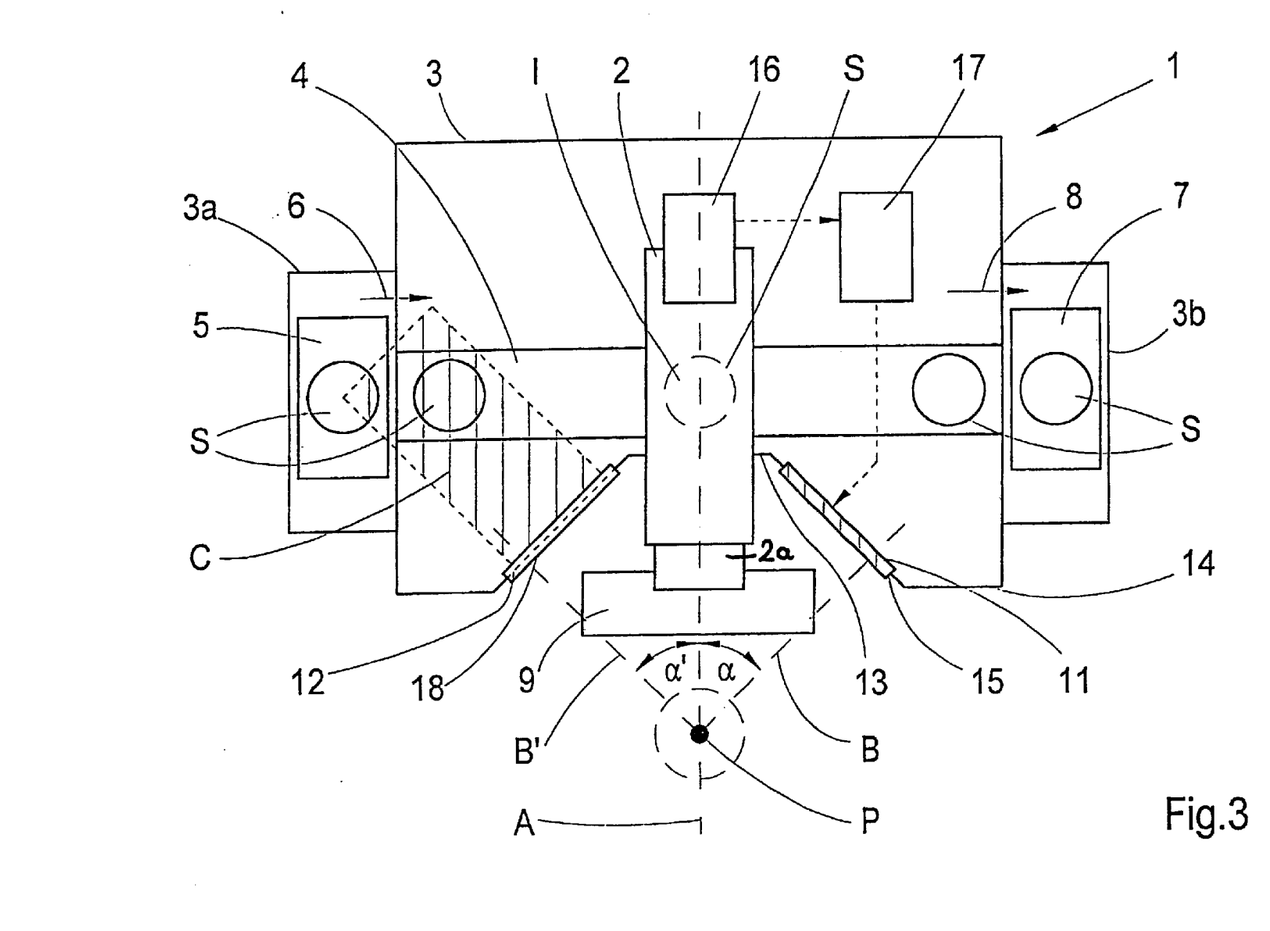
FIG. 3 schematically depicts a second exemplary embodiment of an inspection arrangement according to the present invention, in a plan view.
Figure 4:
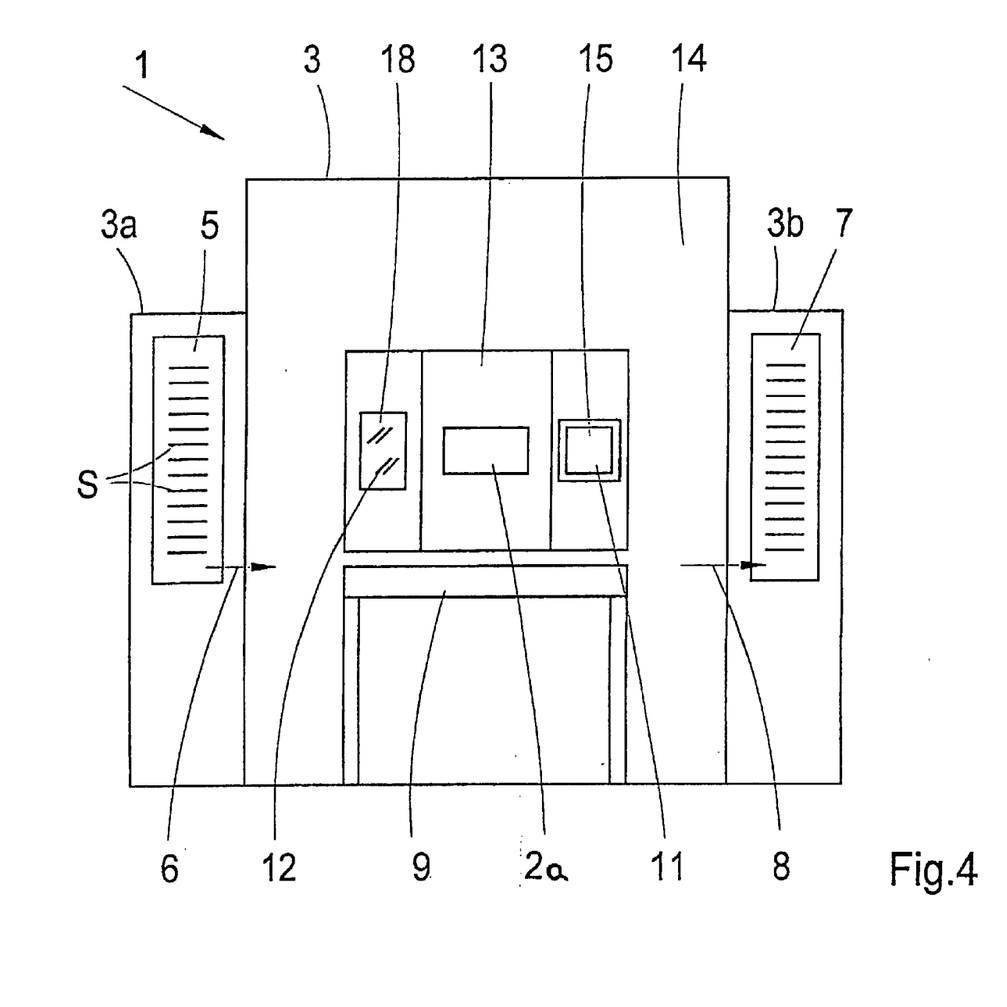
FIG. 4 is a side view of the inspection arrangement of FIG. 3.

FIG. 3 and FIG. 4 show a second exemplary embodiment of an inspection arrangement 1 that corresponds substantially to the first exemplary embodiment shown in FIG. 1 and FIG. 2, but here eyepieces 10 for direct visual viewing of a substrate S are absent. In this case the corresponding information is read off only from monitor 15.

Figure 5:
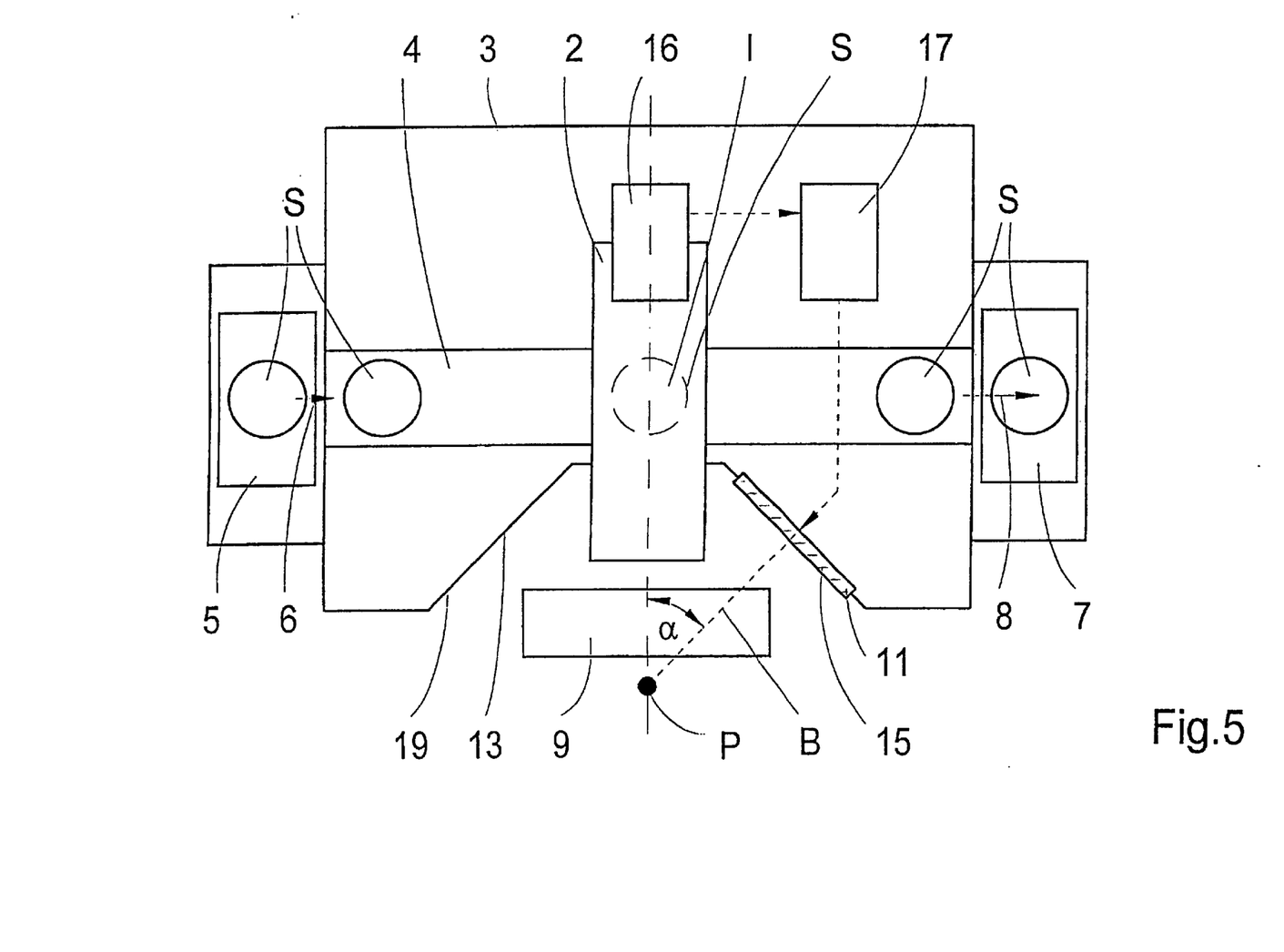
FIG. 5 schematically depicts a third exemplary embodiment of an inspection arrangement according to the invention, in a plan view.
Figure 6:
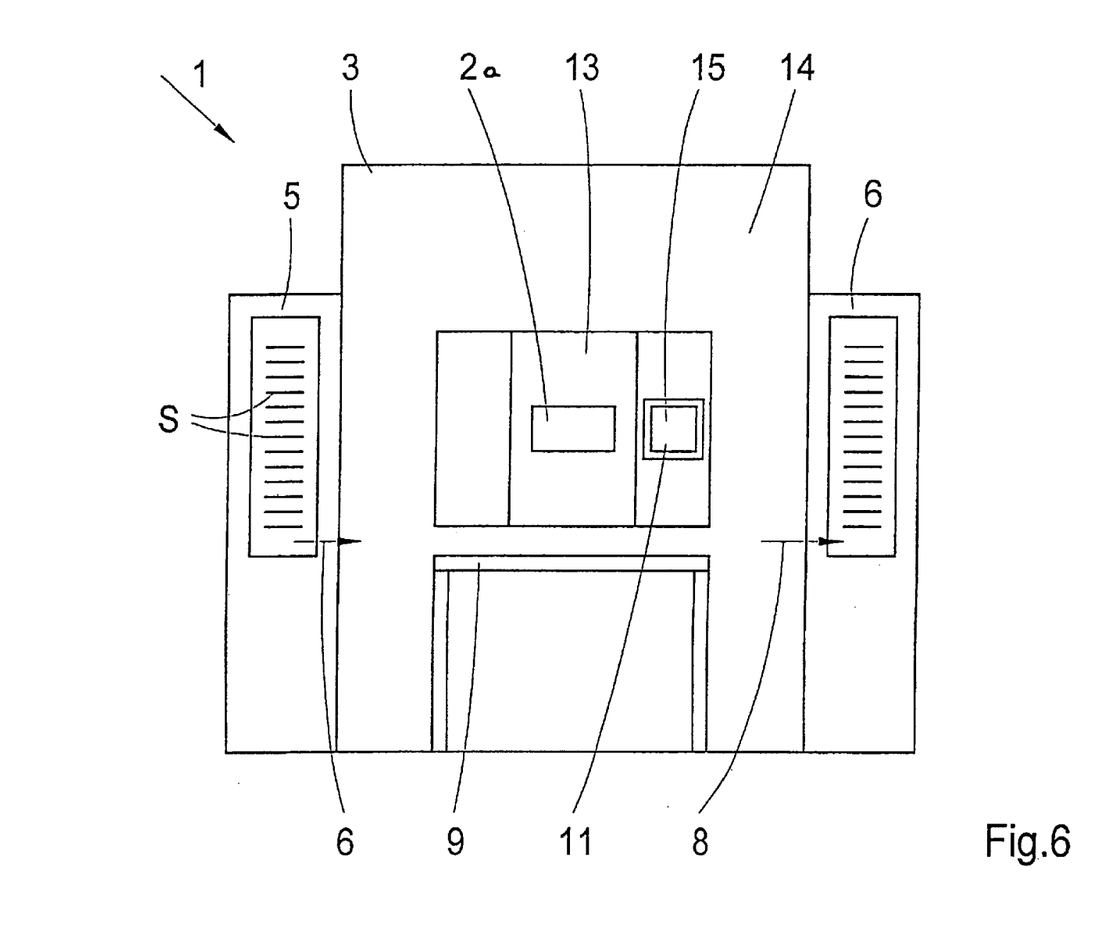
FIG. 6 is a side view of the inspection arrangement of FIG. 5.

An additionally simplified inspection arrangement 1 is depicted in FIG. 5 and FIG. 6 as a third exemplary embodiment. Instead of transparent panel 18, a closed wall section 19 is provided here; a direct view of substrate S is not possible in this case.

In a further variant of the aforementioned exemplary embodiments, control housing 9 can also be integrated into housing 3. It is moreover possible to configure control console 9 removably, so that it does not necessarily need to be arranged at operating position P. In any event, however, it must be ensured that the control instructions entered via control console 9 are transferred to inspection arrangement 1.

The inspection arrangements explained above are all characterized by good ergonomic properties and a compact design.

The invention has been described in detail with particular reference to certain preferred embodiments thereof, but it will be understood that variations and modifications can be effected within the spirit and scope of the invention.

Parts List
1 Inspection arrangement
2 Microscope
2a Microscope viewing port
3 Housing
4 Conveying device
5 First magazine
6 Transfer device
7 Second magazine
8 Transfer device
9 Control console
10 Eyepieces
11 Viewing field
12 Viewing field
13 Recess
14 Outer wall
15 Monitor
16 Image acquisition device
17 Image processing device
18 Transparent panel
19 Closed wall section
A First viewing direction
B, B' Further viewing directions
C Visible region
I Inspection point
P, $P_1$, $P_2$ Operating positions S Substrate α,α' Angles

What is claimed is:

1. An arrangement for the visual inspection of substrates, comprising
   a microscope (2) for viewing the substrate (S) present at an inspection point (I);
   at least one viewing field (11), arranged next to a microscope viewing port (2a), for viewing an image or an image area of the substrate (S); and/or
   at least one further viewing field (12), arranged next to the microscope viewing port (2a), for direct viewing of the substrate (S) or a portion of the substrate (S);
   the microscope viewing port (2a) and the viewing fields (11, 12) being arranged with respect to an operating position (P) in such a way that from the operating position (P), the viewer looks in a first viewing direction (A) perpendicularly onto the microscope viewing port (2a), and in at least one further viewing direction (B, B') approximately perpendicularly in each case onto one of the viewing fields (11, 12); and the first viewing direction (A) enclosing an acute angle (α, α') in each case with the further viewing direction or directions (B, B').

2. An arrangement for the visual inspection of substrates, comprising:
   a microscope for viewing at least one substrate present at an inspection point (I);
   at least one of a first viewing field, arranged next to a microscope viewing port, for viewing an image or an image area of the at least one substrate and a second viewing field, arranged next to the microscope viewing port, for direct viewing of the at least one substrate or a portion of the at least one substrate;
   the microscope viewing port and the at least one of the first and second viewing fields being arranged with respect to an operating position (P) in such a way that from the operating position (P), the viewer looks in a first viewing direction (A) perpendicularly onto the microscope viewing port, and in at least one of a second viewing direction (B) and a third viewing direction (B') approximately perpendicularly onto at least one of the first and second viewing fields, respectively; and the first viewing direction (A) enclosing an acute angle with at least one of the second and third viewing directions (B, B').

3. The arrangement as defined in claim 2, having a housing that surrounds the inspection point (I), the microscope being partially surrounded by the housing and at least one of the first and second viewing fields being positioned in an outer wall of the housing.

4. The arrangement as defined in claim 2, having a control console arranged at a position such that the viewer can use the control console when the viewer's head is at the operating position (P) for inputting control instructions for at least one of the microscope and a conveying device for transporting the at least one substrate to and away from the inspection point (I).

5. The arrangement as defined in claim 4, wherein at least one magazine for receiving substrates, as well as a transfer device for transferring individual substrates between the at least one magazine and the conveying device, are provided.

6. The arrangement as defined in claim 3, wherein at least one magazine is joined to the housing via a coupling point for the substrates.

7. The arrangement as defined in claim 2, further comprising the first viewing field and the second viewing field, wherein the first viewing direction (A) encloses angles (α, α') of less than 50° with each of the second and third viewing directions B, B').

8. The arrangement as defined in claim 7, further comprising the first viewing field and the second viewing field, wherein the first viewing direction (A) encloses angles (α, α') in the range from 30° to 40° with each of the second and third viewing directions (B, B').

9. The arrangement as defined in claim 7, further comprising the first viewing field and the second viewing field, wherein the first viewing direction (A) encloses angles (α, α") of equal magnitude with each of the second and third viewing directions (B, B').

10. The arrangement as defined in claim 2, wherein one of the first and second viewing fields is provided in the horizontal direction on a side of the microscope viewing port.

11. The arrangement as defined in claim 10, further comprising the first viewing field and the second viewing field, wherein the first and second viewing fields are positioned at an identical viewing height.

12. The arrangement as defined in claim 11, wherein the first viewing field is configured as a monitor on which the image or image area of the at least one substrate is displayed.

13. The arrangement as defined in claim 12, wherein the microscope is coupled to an optoelectronic image acquisition device and the latter is connected via an electronic image processing device to the monitor.

14. The arrangement as defined in claim 11, wherein the second viewing field is configured as a transparent panel through which the at least one substrate or a portion of the at least one substrate is directly visible.

15. The arrangement as defined in claim 14, wherein a turntable for reception of at least one substrate, which can be tilted with respect to its rotation axis, is positioned in a visible region (C) of the second viewing field.

16. The arrangement as defined in claim 2, wherein the microscope is configured as a stereomicroscope and the microscope viewing port comprises two eyepieces.

17. The arrangement as defined in claim 16, wherein the eyepieces are positioned vertically over the control console.

18. The arrangement as defined in claim 16, wherein the spacing between one of the eyepieces and the first viewing field or the second viewing field is approximately 30 cm.

19. The arrangement as defined in claim 3, wherein the first viewing field or the second viewing field are arranged in a recess of the outer wall of the housing.

20. The arrangement as defined in claim 2, further comprising the first viewing field and the second viewing field, the microscope viewing port and the first and second viewing fields being arranged with respect to the operating position (P) in such a way that from the operating position (P), the viewer looks in the first viewing direction (A) perpendicularly onto the microscope viewing port, and in the second viewing direction (B) and the third viewing direction B' approximately perpendicularly onto the first and second viewing fields, respectively; and the first viewing direction (A) enclosing acute angles with the second and third viewing directions (B, B').

* * * * *